United States Patent [19]

Varaprath et al.

[11] Patent Number: 4,831,064

[45] Date of Patent: May 16, 1989

[54] ORGANOPOLYSILOXANE COMPOSITIONS CURABLE BY ULTRAVIOLET RADIATION

[75] Inventors: Padmakumari J. Varaprath; Maris J. Ziemelis, both of Midland, Mich.

[73] Assignee: Dow Corning Corporation, Midland, Mich.

[21] Appl. No.: 218,414

[22] Filed: Jul. 11, 1988

Related U.S. Application Data

[63] Continuation of Ser. No. 944,721, Dec. 22, 1986, abandoned.

[51] Int. Cl.$^4$ ............................................. C08G 77/28
[52] U.S. Cl. ...................................... 522/99; 528/30; 528/32
[58] Field of Search ...................... 522/99; 528/30, 32

[56] References Cited

U.S. PATENT DOCUMENTS

| | | | |
|---|---|---|---|
| 3,726,710 | 4/1973 | Berger et al. | 117/93.31 |
| 4,052,529 | 10/1977 | Bokerman et al. | 428/537 |
| 4,070,526 | 1/1978 | Colquhoun et al. | 428/537 |
| 4,290,869 | 9/1981 | Pigeon | 204/159.13 |
| 4,595,471 | 6/1986 | Preiner | 522/99 |
| 4,596,720 | 6/1986 | Keryk | 528/30 |
| 4,608,270 | 8/1986 | Varaprath | 522/99 |

FOREIGN PATENT DOCUMENTS

| | | |
|---|---|---|
| 1029491 | 4/1978 | Canada . |
| 0174647 | 3/1986 | European Pat. Off. . |
| 57-52371 | 11/1982 | Japan . |
| 052371 | 11/1982 | Japan . |
| 1433461 | 4/1976 | United Kingdom . |

Primary Examiner—John C. Bleutge
Assistant Examiner—David Buttner
Attorney, Agent, or Firm—George A. Grindahl

[57] ABSTRACT

Ultraviolet light-curable compositions which contain a photosensitizer compound and an organosilicon compound which contains (meth)acrylamido-substituted hydrocarbon radicals have improved cure in air when a mercaptoorganosilicon compound is added. The improved compositions are particularly useful as coating compositions for fast-paced operations where the excluding of air from any portion of the curing zone is not desired.

9 Claims, No Drawings

4,831,064

ORGANOPOLYSILOXANE COMPOSITIONS CURABLE BY ULTRAVIOLET RADIATION

This is a continuation of application Ser. No. 06/944,721 filed on 12/22/86, now abandoned.

BACKGROUND OF THE INVENTION

The present invention relates to radiation-curable organosilicon compositions; and in particular to organosilicon compositions which cure when exposed to ultraviolet light, herein also referred to as UV. More specifically the present invention relates to improved compositions which comprise an organosilicon compound bearing one or more (meth)acrylamide-substituted hydrocarbon radicals and an organosilicon compound bearing one or more mercapto-substituted hydrocarbon radicals.

Berger et al., U.S. Pat. No. 3,726,710, disclose silicone paper release compositions which consist of a vinyl-containing siloxane and a photosensitizer and which cure when exposed to high intensity, predominantly continuum, light radiation. Although the compositions of Berger et al. can contain various olefin-containing siloxanes and various substituted organic radicals, the specific disclosure of compositions containing (meth)acrylamide-containing siloxanes, with or without mercapto-containing siloxanes, is not approached.

The use of mercapto-containing silicon compounds in vinyl-containing silicone compositions has been disclosed by Gant, Canadian Pat. No. 1,029,491 and U.K. Pat. No. 1,433,461; by Bokermann et al., U.S. Pat. No. 4,052,529; and by Colquhoun et al., U.S. Pat. No. 4,070,526. In particular, Gant teaches that the use of a mercapto-functional silane or siloxane accelerates the cure of a composition containing a vinyl-containing siloxane and a siloxane bearing silicon-bonded hydrogen atoms. However, the use of mercapto-containing silicon compounds in UV-curable compositions which contain (meth)acrylamide-containing silicon compounds is not suggested by these references.

Pigeon, U.S. Pat. No. 4,290,869, teaches that the presence of —SH radicals, contained in certain mercaptoorganosilanes or siloxanes, contributes to a reduction in the amount of UV exposure needed to cure a photopolymerizable composition containing certain (meth)acryloxy-containing silanes or siloxanes. The silanes and siloxanes of Pigeon are prepared from alkoxysilanes and hydroxyl-terminated polydiorganosiloxanes in such a manner that they, and the photopolymerizable compositions prepared therefrom, contain not only (meth)acryloxy curing sites but moisture-reactive sites as well. Pigeon says nothing about (meth)acrylamide-containing siloxanes.

Preiner et al., European patent application No. 174 647 disclose UV-curable compositions which contain an acryloxy-terminated siloxane polymer, a mercaptoalkyl-substituted siloxane polymer, a photosensitizer and, optionally, an organotitanium or organotin compound. These compositions are said to be useful as potting compositions for electronic units. (Meth)acrylamide-containing compositions are not suggested by this reference.

Takamizawa et al., Japanese Publication No. 57-52371 (82-52371), disclose photosetting silicone compositions which contain a photosensitizer and certain (meth)acrylamide-containing siloxanes. Patentees' compositions are said to not suffer from the drawbacks that are exhibited by the (meth)acryloxy-containing siloxane compositions of the art, such as having a tacky surface after being cured by UV in an oxygen-containing atmosphere. However, patentees' compositions are limited to siloxanes which bear mono-(meth)acrylamide-substituted radicals so the oxygen inhibition of organosilicon compositions containing di-(meth)acrylamide-substituted radicals was not appreciated.

Varaprath, U.S. Pat. No. 4,608,270, discloses curable compositions which comprise di-(meth)acrylamide-containing silicon compounds. While these compositions are readily curable when exposed to UV light in the absence of oxygen, particularly when they contain a photosensitizer, it has been found that certain of these compositions require undesirably large amounts of UV in order to be cured to the tack-free state, in thick or thin section, when said exposure is done in an oxygen-containing atmosphere. With thick sections, such as coatings having a thickness of a few mils, the sub-surface portion of the coating will cure but the surface remains tacky.

An oxygen-free atmosphere and/or increased doses of UV can be used during the cure of a curable composition; however, either option is of limited value in commerce because of the additional expense associated therewith. Additionally the heat associated with UV radiation becomes excessive for some applications when large doses are used.

There is thus a need for silicone compositions which cure rapidly in air when exposed to UV radiation. The present invention provides those compositions.

BRIEF SUMMARY OF THE INVENTION

It is a preferred object of this invention to provide improved radiation-curable compositions comprising a siloxane compound bearing di-(meth)acrylamide-substituted radicals. It is also an object of the present invention to provide improved radiation-curable organosilicon compositions. More particularly, it is an object of this invention to provide UV-curable silicone compositions which can be rapidly cured to the tack-free state upon being exposed to UV from conventional sources in the presence of oxygen. It is an additional object of this invention to provide an improved method for coating a substrate with a cured organosilicon coating. It is a particular object of this invention to provide a method for providing a substrate with a rapidly cured, adhesive-releasing organosilicon coating.

These objects, and others which will become apparent to one skilled in the art of curable organosilicon compositions, are obtained by the present invention which, briefly stated, comprises mixing a mercaptoorganosilicon compound, a (meth)acrylamides-substituted organosilicon compound and a radiation-activated photopolymerization catalyst to provide a radiation-curable composition. The presence of even small amounts of the mercaptoorganosilicon compound in the (meth)acrylamide-substituted compound leads to a more rapid and/or a more complete cure of the composition when it is exposed to ultraviolet light in the presence of air.

DETAILED DESCRIPTION OF THE INVENTION

In a first aspect this invention relates to an ultraviolet light-curable composition comprising (i) a (meth)acrylamidoorganosilicon compound containing at least one silicon-bonded, (meth)acrylamido-substituted hydrocarbon radical having the formula —Q(NAQ')$_a$NAZ wherein a has a value of 0 or 1, Z denotes H or R, R denotes a monovalent hydrocarbon radical, Q and Q' denote divalent hydrocarbon radicals and A denotes a (meth)acrylyl radical having the formula —C(O)CB=CH$_2$ wherein B denotes hydrogen or methyl; any remaining silicon-bonded radicals in said (meth)acrylamidoorganosilicon compound being selected from the group consisting of organic radicals, divalent oxygen atoms linking silicon atoms, hydrogen atoms and hydroxyl radicals, (ii) a mercaptoorganosilicon compound containing at least one silicon-bonded, mercapto-substituted hydrocarbon radical having the formula —QSH, wherein Q denotes a divalent hydrocarbon radical, any remaining silicon-bonded radicals in said mercaptoorganosilicon compound being selected from the group consisting of organic radicals, divalent oxygen atoms linking silicon atoms, hydrogen atoms and hydroxyl radicals and (iii) a photopolymerization-initiating amount of a photosensitizer compound; the relative amounts of said (meth)acrylamidoorganosilicon and mercaptoorganosilicon compounds being sufficient to provide from 0.2 to 2 —SH radicals for every —C(O)CB=CH$_2$ radicals.

Herein terms having the root (meth)acryl, such as (meth)acrylamido and (meth)acrylyl, are terms of the and/or type; i.e. said terms refer to methacryl and/or acryl terms, such as methacrylamido and/or acrylamido.

The (meth)acrylamidoorganosilicon compound in the compositions of this invention can have any structure provided that it contains at least one silicon atom having bonded thereto the characteristic (meth)acrylamido-substituted hydrocarbon radical, hereinafter delineated, and any other silicon bonds are satisfied by regular radicals selected from the group consisting of organic radicals, other than the (meth)acrylamido-substituted hydrocarbon radical noted above, hydroxyl radicals, hydrogen atoms and divalent oxygen atoms linking silicon atoms. Thus (meth)acrylamidoorganosilicon compounds include silanes, siloxanes, silcarbanes and silcarbanesiloxanes.

The characteristic silicon-bonded (meth)acrylamido-substituted hydrocarbon radical has the formula —Q(NAQ')$_a$NAZ, wherein Q and Q' denote divalent hydrocarbon radicals, Z denotes a hydrogen atom or a monovalent hydrocarbon radical (R radical), a has a value of 0 or 1 and A denotes a (meth)acrylyl radical having the formula —C(O)CH=CH$_2$ or —C(O)C(CH$_3$)=CH$_2$.

Examples of said Q radicals and Q' radicals include, but are not limited to, alkylene radicals such as —CH$_2$CH$_2$—, —CH$_2$CH(CH$_3$)—, —CH$_2$CH$_2$C$_2$—, —CH$_2$CH(CH$_3$)CH$_2$—, and —(CH$_2$)$_6$—; and arylene radicals such as —C$_6$H$_4$—, —CH$_2$C$_6$H$_4$— and CH$_2$C$_6$H$_4$CH$_2$—. Q can be the same as or different from Q', as desired.

Examples of said hydrocarbon Z radicals (R radicals) include, but are not limited to, alkyl radicals such as methyl, ethyl, propyl, butyl, hexyl and octyl; cycloaliphatic radicals such as cyclohexyl; aryl radicals such as phenyl, benzyl, styryl, tolyl and xenyl; and alkenyl radicals such as vinyl and allyl.

In a preferred embodiment of this invention the (meth)acrylamidoorganosilicon compound is prepared from silicon-containing precursors that have been prepared from ethylene diamine and a suitable silicon compound and thus contain silicon-bonded diamine radicals of the formula —QNHCH$_2$CH$_2$NH$_2$. Thus, in the (meth)acrylamidoorganosilicon compound formula Z preferably denotes H, a preferably has a value of 1 and Q' preferably denotes —CH$_2$CH$_2$—.

Preferably Q is an alkylene radical having from 3 to 10 carbon atoms and there are at least 3 carbon atoms between the silicon atom and the nitrogen bonded to the Q radical. Examples of preferred Q radicals are —CH$_2$CH(CH$_3$)CH$_2$— and —CH$_2$CH$_2$CH$_2$—.

In the (meth)acrylamidoorganosilicon compound A denotes a (meth)acrylyl radical having the formula —C(O)CB=CH$_2$ wherein B denotes h or CH$_3$, i.e., an acrylyl radical or a methacrylyl radical.

Examples of characteristic (meth)acrylamido-substituted hydrocarbon radicals include, but are not limited to,

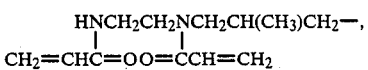

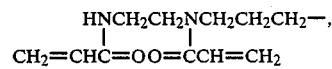

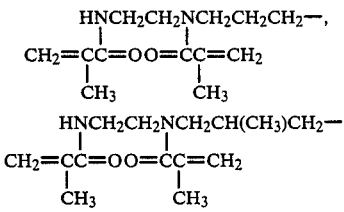

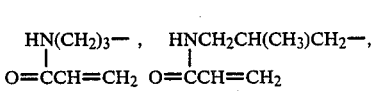

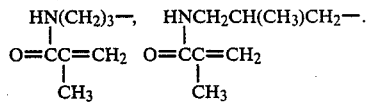

Regular silicon-bonded radicals that are permitted in the (meth)acrylamidoorgansilicon compound, in addition to the required (meth)acrylamido-substituted hydrocarbon radicals, include hydroxyl radicals, hydrogen atoms, organic radicals and divalent oxygen atoms linking silicon atoms.

Examples of said organic radicals include divalent hydrocarbon radicals linking silicon atoms, such as Q and Q' radicals noted above, and halogenated derivatives thereof; monovalent hydrocarbon radicals, such as R radicals noted above, and halogen derivatives thereof; (meth)acryloxy radicals and alkoxy radicals such as methoxy radicals. Preferably said organic radicals contain no more than 6 carbon atoms, such as methyl, 3,3,3-trifluoropropyl, phenyl and vinyl radicals. For most applications of the compositions of this invention the organic radicals are preferably methyl radicals.

The (meth)acrylamidoorganosilicon compound typically has a silane or siloxane structure represented by the average unit formula R$_c${NAZ(Q'NA)$_a$Q}$_d$SiO$_{(4-c-d)/2}$ wherein R, A, Z, Q, Q' and a have the general and preferred meanings noted above and c denotes a number having a value of from 0 to 3, such as 0, 0.5, 1.01, 2, 2.1 and 3, d denotes a number having a value of from >0 to 4, such as 0.01, 0.5, 1, 2 and 3, and c+d has a value of from 1 to 4 such as 1.5, 1.99, 2.01, 3 and 4. Of course, as noted above, the silane or siloxane must contain an average of at least one (meth)acrylamido-substituted hydrocarbon radical per molecule.

Said (meth)acrylamidoorganosilanes have the formula $(R)_c Si\{Q(NAQ')_a NAZ\}_{4-c}$ wherein c denotes a number having a value of 0, 1, 2 or 3.

The compositions of this invention preferably contain said (meth)acrylamidoorganosiloxanes which have the average unit formula $R_c\{NAZ(Q'NA)_a Q\}_d SiO_{(4-c-d)/2}$ wherein c denotes a number having a value of from 0 to <3, such as 0, 0.5, 1.01, 2 and 2.5, d denotes a number having a value of from >0 to 3, such as 0.01, 0.5, 1, 2 and 3, and c+d has a value of from 1 to 3 such as 1.5, 1.99, 2.01 and 3.

In addition to siloxane units which contain the required (meth)acrylamido-substituted hydrocarbon radical the (meth)acrylamidoorganosiloxanes can contain siloxane units which are free of (meth)acrylamido-substituted hydrocarbon radicals. These siloxane units have the general formula $R_e SiO_{(4-e)/2}$, wherein R is as denoted above and e has a value of 0, 1, 2 or 3; such as for example $MeSiO_{3/2}$, $Me_2SiO_{2/2}$, $MeViSiO_{2/2}$, $MePhSiO_{2/2}$, $Me_3SiO_{1/2}$, $Me_2(OA)SiO_{1/2}$, $ViMe_2SiO_{1/2}$ and $SiO_{4/2}$ units. The (meth)acrylamidoorganosilicon compound can also contain siloxane units which bear hydrocarbon radicals which contain partial (meth)acrylamide substitution, such as $NAZQ'NHQSi(R_e)O_{(4-e)/2}$.

The siloxane units which contain the required (meth)acrylamido-substituted hydrocarbon radical have the formulae $R_e SiO_{(4-e)/2}$, noted immediately above, except that at least one of the R radicals is replaced with said (meth)acrylamido-substituted hydrocarbon radical.

Additionally, trace amounts of silicon-bonded regular residue radicals, such as hydroxyl radicals, alkoxy radicals and hydrogen atoms, may be found in these preferred siloxanes. Residue radicals typically arise from the particular synthesis method that was used to prepare the siloxane.

Preferred (meth)acrylamidoorganosiloxanes for use in the compositions of this invention have the formula $YR^2SiO(R^2SiO)_x(YRSiO)_y SiR^2Y$ wherein each Y independently denotes an R radical or a $-Q(NAQ')_a NAZ$ radical, delineated above, and x and y denote numbers having average values of from 0 to 5000 and 0 to 500, respectively; provided that the (meth)acrylamidoorganosiloxane contains at least two (meth)acrylamido-substituted hydrocarbon radicals.

Examples of preferred (meth)acrylamidoorganosiloxanes include, but are not limited to, $Me_3SiO(Me_2SiO)_x(MeYSiO)_y SiMe_3$,
$YMe_2SiO(Me_2SiO)_x SiMe_2Y$,
$YMe_2SiO(Me_2SiO)_x(MeYSiO)_y SiMe_2Y$,
$Me_3SiO(MeYSiO)_y SiMe_3$,
$YMe_2SiO(MeYSiO)_y SiMe_2Y$ and
$HOMe_2SiO(Me_2SiO)_x(MeYSiO)_y SiMe_2OH$, (Meth)acrylamidoorganosiloxanes can also have a cyclic or branched structure such as $(YMe_{SiO})_4Si$ and $(YMeSiO)_4$, in addition to the linear structure noted above.

Here the symbols Me, Ph and Vi denote methyl, phenyl and vinyl, respectively.

Curable compositions of this invention which are useful for coating a flexible substrate such as paper, polymer films and metal foils should comprise, as the (meth)acrylamidoorganosilicon compound, a siloxane having the formula $YR^2SiO(R^2SiO)_z(YRSiO)_g SiR^2Y$ and wherein Y and R have the general and preferred meanings noted above, z has a value of from 10 to 2000, preferably 50 to 500, and g has a value of from 0 to 0.1 z, provided that there are an average of at least 2, preferably 3 to 10, (meth)acrylamido-substituted hydrocarbon radicals per molecule of the siloxane. When the curable composition is to be used as a solventless coating composition this siloxane preferably has a viscosity of from 100 to 10,000, and most preferably 500 to 1,000 centistokes at 25° C.

Specific examples of (meth)acrylamidoorganosiloxanes to be used in curable coating compositions include $Me_3SiO(Me_2SiO)_{500}(MeYSiO)_5 SiMe_3$.
$Me_3SiO(Me_2SiO)_{50}(MeYSiO)_2 SiMe_3$,
$YMe_2SiO(Me_2SiO)_{2000}SiMe_2Y$,
$YMe_2SiO)(Me_2SiO)_{100}(MeYSiO)_3 SiMe_2Y$,
$HOMe_2SiO(Me_2SiO)_{1000}(MeYSiO)_4 SiMe_2OH$, wherein Y denotes $-CH_2CH_2CH_2NACH_2CH_2NAH$ or $-CH_2CH(CH_3)CH_2NACH_2CH_2NAH$ and A is an acrylyl radical.

The (meth)acrylamidoorganosilicon compounds can be prepared by any suitable method. The disclosures of U.S. Pat. Nos. 2,929,829 and 4,608,270 are incorporated herein by reference to show how to prepare the numerous (meth)acrylamidoorganosilicon compounds that are suitable for use in the compositions of this invention.

(Meth)acrylamidoorganosilicon compounds bearing di-(meth)acrylamido-substituted hydrocarbon radicals are preferably prepared by the method of Varaprath, U.S. Pat. No. 4,608,270. Briefly, this method comprises admixing, in the presence of an aqueous solution of a water-soluble alkaline material and a water-insoluble solvent and at as low a temperature as possible, a (meth)acrylyl chloride to an aminosilicon compound having at least one silicon-bonded amino-substituted hydrocarbon radical containing at least one nitrogen-bonded hydrogen.

The silicon-bonded amino-substituted hydrocarbon radical has the formula $-Q(NHQ')_a NHZ$ wherein Q, Q' and Z have the general and preferred meanings denoted above and a has a value of 0 or 1. Examples of amino-substituted hydrocarbon radicals include, but are not limited to, $NH_2CH_2CH_2CH_2-$, $CH_3NHCH_2CH_2CH_2-$, $NH_2CH_2CH(CH_3)CH_2-$, $NH_2CH_2CH_2NHCH_2CH_2CH_2-$, $NH_2CH_2CH_2NHCH_2CH(CH_3)CH_2-$, $NH_2(CH_2)_6NH(CH_2)_3-$ and $NH_2(CH_2)_6NHCH_2CH(CH_3)CH_2-$.

Aminosilicon compounds are well known in the organosilicon art and need no detailed description herein as to their preparation. Some are commercially available. The disclosures of U.S. Pat. Nos. 2,557,803; 2,738,357; 2,754,312; 2,762,823; 2,998,406; 3,045,036; 3,087,909; 3,355,424; 3,560,543; 3,890,269; 4,036,868; 4,152,346 and 4,507,455 are incorporated herein by reference to further teach how to prepare aminosilicon compounds that can be used to prepare (meth)acrylamidoorganosilicon compounds.

The alkaline material, (meth)acrylyl chloride aminosilicon compound are preferably used in equivalent amounts; e.g. one molecule of sodium hydroxide for every molecule of (meth)acrylyl chloride for every molecule of aminosilicon compound which bears an acylatable amino group. The amount of solvent that is used in the method of this invention should be sufficient to dissolve the aminosilicon compound and, preferably, the organosilicon product as well.

The mercaptoorganosilicon compound in the compositions of this invention can have any structure provided that it contains at least one silicon atom having bonded thereto a characteristic mercapto-substituted hydrocarbon radical, hereinafter delineated, and any other silicon bonds are satisfied by regular radicals selected from the group consisting of organic radicals, other than the mercapto-substituted hydrocarbon radical noted above, hydroxyl radicals, hydrogen atoms and divalent oxygen atoms linking silicon atoms. Thus mercaptoorganosilicon compound includes silanes, siloxanes, silcarbanes and silcarbanesiloxanes.

The characteristics silicon-bonded mercapto-substituted hydrocarbon radical has the formula —QSH wherein Q denotes a divalent hydrocarbon radicals.

Examples of said Q radicals include, but are not limited to, alkylene radicals such as —CH$_2$CH$_2$—, —CH$_2$CH(CH$_3$)—, —CH$_2$CH$_2$CH$_2$—, —CH$_2$CH(CH$_3$)CH$_2$—, and —(CH$_2$)$_6$—; and arylene radicals such as —C$_6$H$_4$—, —CH$_2$C$_6$H$_4$— and CH$_2$C$_6$H$_4$CH$_2$—.

Preferably Q is an alkylene radical having from 3 to 10 carbon atoms and there are at least 3 carbon atoms between the silicon atom and the sulfur bonded to the Q radical. Examples of preferred —QSH radicals include, but are not limited to, HS(CH$_2$)$_2$—, HSCH$_2$CH(CH$_3$)CH$_2$— and HS(CH$_2$)$_4$—.

Regular silicon-bonded radicals that are permitted in the mercaptoorganosilicon compound, other than the required mercapto-substituted hydrocarbon radicals, include hydroxyl radicals, hydrogen atoms, organic radicals and divalent oxygen atoms linking silicon atoms.

Examples of said organic radicals include divalent hydrocarbon radicals linking silicon atoms, such as Q and Q′ radicals noted above, and halogenated derivatives thereof; monovalent hydrocarbon radicals, such as R radicals noted above, and halogen derivatives thereof; and alkoxy radicals, such as methoxy radicals. Preferably said organic radicals contain no more than 6 carbon atoms, such as methyl, 3,3,3-trifluoropropyl, phenyl and vinyl radicals. For most applications of the compositions of this invention the organic radicals are preferably methyl radicals.

The mercaptoorganosilicon compound typically has a silane or siloxane structure represented by the average unit formula R$_c$(HSQ)$_d$SiO$_{(4-c-d)/2}$ wherein R and Q have the general and preferred meanings noted above and c denotes a number having a value of from 0 to 3, such as 0, 0.5, 1.01, 2, 2.1 and 3, d denotes a number having a value of from >0 to 4, such as 0.01, 0.5, 1, 2 and 3, and c+d has a value of form 1 to 4 such as 1.5, 1.99, 2.01, 3 and 4. Of course, as noted above, the silane or siloxane must contain an average of at least one mercapto-substituted hydrocarbon radical per molecule.

Said mercaptoorganosilanes have the formula (R)$_c$Si(QSH)$_{4-c}$ wherein c denotes a number having a value of 0, 1, 2 or 3.

The compositions of this invention preferably contain said mercaptoorganosiloxanes which have the average unit formula R$_c$(HSQ)$_d$SiO$_{(4-c-d)/2}$ wherein c denotes a number having a value of from 0 to <3, such as 0, 0.5, 1.01, 2 and 2.5, d denotes a number having a value of from >0 to 3, such as 0.01, 0.5, 1, 2 and 3, and c+d has a value of from 1 to 3 such as 1.5, 1.99, 2.01 and 3.

In addition to siloxane units which contain the required mercapto-substituted hydrocarbon radical the mercaptoorganosiloxanes can contain siloxane units which are free of mercapto-substituted hydrocarbon radicals. These siloxane units have the general formula R$_e$SiO$_{(4-e)/2}$, wherein R is as denoted above and e has a value of 0, 1, 2 or 3; such as for example MeSiO$_{3/2}$, Me$_2$SiO$_{2/2}$, MeViSiO$_{2/2}$, MePhSiO$_{2/2}$, Me$_3$SiO$_{1/2}$, Me$_2$(OA)SiO$_{1/2}$, ViMe$_2$SiO$_{1/2}$ and SiO$_{4/2}$ units.

The siloxane units which contain the required mercapto-substituted hydrocarbon radical have the formula R$_e$SiO$_{(4-e)/2}$, noted immediately above, except that at least one of the R radicals is replaced with said mercapto-substituted hydrocarbon radical.

Additionally, trace amounts of silicon-bonded regular residue radicals, such as hydroxyl radicals, alkoxy radicals and hydrogen atoms, may be found in these preferred siloxanes. Said residue radicals typically arise from the particular synthesis method that was used to prepare the siloxane.

Preferred mercaptoorganosiloxanes for use in the compositions of this invention have the formula MR$^2$SiO(R$^2$SiO)$_x$(MRSiO)$_y$SiR$^2$M wherein each M independently denotes an R radical or a —QSH radical and x and y denote numbers having average values of from 0 to 5000 and 0 to 500, respectively, provided that the mercaptoorganosiloxane contains at least two mercapto-substituted hydrocarbon radicals.

Examples of preferred mercaptoorganosiloxanes include, but are not limited to,
Me$_2$SiO(Me$_2$SiO)$_x$(MeMSiO)$_y$SiMe$_3$,
MMe$_2$SiO(Me$_2$SiO)$_x$SiMe$_2$M,
MMe$_2$SiO(Me$_2$SiO)$_x$(MeMSiO)$_y$SiMe$_2$M,
Me$_3$SiO(MeMSiO)$_y$SiMe$_3$,
MMe$_2$SiO(MeMSiO)$_y$SiMe$_2$M and
HOMe$_2$SiO(Me$_2$SiO)$_x$(MeMSiO)$_y$SiMe$_2$OH, The mercaptoorganosiloxanes can also have a cyclic or branched structure such as (MMe$_2$SiO)$_4$Si and (MMeSiO)$_4$, in addition to the noted linear structure, as desired.

Curable compositions of this invention which are useful for coating a flexible substrate such as paper, polymer films and metal foils should comprise, as the mercaptoorganosilicon compound, a siloxane having the formula MR$^2$SiO(R$^2$SiO)$_z$(MRSiO)$_g$SiR$^2$M wherein M and R have the general and preferred meanings noted above, z has a value of from 10 to 2000, preferably 50 to 500, and g has a value of from 0 to 0.1 z, provided that there are an average of at least 2, preferably 3 to 10, mercapto-substituted hydrocarbon radicals per molecule of the siloxane. This siloxane preferably has a viscosity of from 100 to 10,000, and most preferably 500 to 1,000 centistokes at 25° C. when the curable composition is to be used as a solventless coating composition.

Specific examples of mercaptoorganosiloxanes to be used in curable coating compositions include
Me$_3$SiO(Me$_2$SiO)$_{500}$(MeMSiO)$_5$SiMe$_3$,
Me$_3$SiO(Me$_2$SiO)$_{50}$(MeMSiO)$_2$SiMe$_3$,
MMe$_2$SiO(Me$_2$SiO)$_{2000}$SiMe$_2$M,
MMe$_2$SiO(Me$_2$SiO)$_{100}$(MeMSiO)$_3$SiMe$_2$M,
HOMe$_2$SiO(Me$_2$SiO)$_{1000}$(MeMSiO)$_4$SiMe$_2$OH,
wherein M denotes —CH$_2$CH$_2$CH$_2$SH or —CH$_2$CH(CH$_3$)CH$_2$SH.

The mercaptoorganosilicon compounds can be prepared by any suitable method. The disclosures of U.S. Pat. Nos. 3,590,065; 3,632,715; 4,052,529; 4,070,526; 4,252,932 and 4,311,760 are incorporated herein by reference to show how to prepare mercaptoorganosilicon compounds. Mercaptoorganosiloxanes are preferably prepared from hydrolyzable mercaptoorganosilanes by way of well-known hydrolysis and/or cohydrolysis procedures, optionally also using siloxane equilibration procedures.

The amounts of the (meth)acrylamindoorganosilicon and mercaptoorganosilicon compounds that are used in the compositions of this invention are sufficient to provide from 0.1 to 2, preferably from 0.1 to 1.0, —SH radicals for every —C(O)CB=CH$_2$ radical in the composition. Compositions comprising less than about 0.1 —SH radical for every —C(O)CB=CH$_2$ radical in the composition do not seem to be improved, with respect to increased cure rate in air, over the compositions of the art which are free of mercaptoorganosilicon compounds. Compositions comprising more than about 2 —SH radicals for every —C(O)CB=CH$_2$ radical in the composition are not expected to have any benefit over those compositions having 2 or less —SH radicals for every —C(O)CB=CH$_2$ and, indeed are less desired because of a residual sulfur-based odor that is expected to remain with the cured composition.

The compositions of this invention further comprise a photopolymerization-initiating amount of a photosensitizer compound. Examples of suitable photosensitizer compounds include, but are not limited to, benzoin; benzoin alkyl ethers such as methyl, ethyl, isopropyl or isobutyl benzoin ether; acetophenone derivatives such as dialkoxyacetophenone such as diethoxyacetophenone, di- and trichloroacetophenones, α,α-dimethoxy-α-phenylacetophenone, 1-hydroxycyclohexylphenyl ketone, 2-hydroxy-2-methyl-1-phenylpropane-1-one; methylphenyl glyoxylate, 4-benzoylbenzyl-trimethylammonium chloride; α-acyloxime esters such as 1-phenyl-1,2-propanedione-2-(O-ethoxycarbonyloxime), thioxanthane and its derivatives, benzophenone in combination with a chain transfer agent such as a NH group and azo-bis(isobutyronitrile).

The amount of the photosensitizer compound that is to be used in the compositions of this invention is merely that amount that will initiate the cure of the composition when it is exposed to photoactive UV. Said amount can be easily determined for any particular composition by routine experimentation, such as by using an amount of about 5 percent by weight, based on the weight of the (meth)acrylamidoorganosilicon compound and the mercaptoorganosilicon compound, of the photosensitizer compound and including amounts incrementally greater and lesser than 5 percent in other compositions and exposing the compositions to photoactive UV.

Photoactive UV, and sources thereof, are well known in the radiation-curable silicone composition art and need no detailed explanation herein. The reader is referred to any of the standard references that teach the polymerization of acrylyl-containing monomers. Included herein by reference are *Kirk-Othmer Encyclopedia of Chemistry and Technology;* John Wiley and Sons, N.J., Second Edition, 1972, Vol. I, pp. 274–284 and *Encyclopedia of Polymer Science and Technology;* John Wiley and Sons, N.J., 1966, Vol. I, pp. 177 to 197. for the purposes of this invention photoactive UV radiation preferably comprises electromagnetic radiation having a wavelenght of from 200 to 400 nm.

The curable compositions of this invention can further comprise optional components which are commonly used in curable silicon-containing compositions. Examples of said optional components include, but are not limited to, solvents such as those used to prepare the organosilicon compound used therein, polymerizable vinyl monomers, emulsion-forming components such as water and surfactants, colorants, stabilizers, fillers such as silica and carbon, adhesion promoters and surface modifiers such as lubricants and release agents.

The curable coating compositions of this invention thus have many of the utilities of curable compositions such as molding, encapsulating, sealing and coating. In particular they find utility for coating flexible substrates such as paper, metal foil, polymer films, optical fibers and textiles and relatively non-flexible substrates such as polymer laminates, such as circuit boards, siliceous substrates such as ceramic, glass and brick, wood substrates and molded, cast and stamped metal articles. The curable coatings of this invention are useful in the adhesive release art, the electronic art such as encapsulating and photoresist, the graphic art etc.

Thus, in a second aspect the present invention relates process for providing a cured silicon-containing coating on a substrate, said process comprising (A) applying the curable coating composition of this invention to the substrate and thereafter (B) exposing the applied coating to photoactive ultraviolet light until the coating has been cured.

In the process of this invention the curable coating composition of this invention is applied to a substrate as a thin layer by any suitable manner such as brushing, spraying, rolling, dipping or spreading. By a thin layer it is meant from a monomolecular layer to a hundred mils. Curable coating compositions of this invention are typically applied in a layer having a thickness of from 0.01 to 100 mils.

After the composition has been applied to the substrate it must be exposed to photoactive UV for a period of time sufficient to cure the coating. By cure it is mean conversion of the coated composition from the liquid to the non-liquid state, preferably to the nil migration, nil rub-off, nil smear condition described below.

As noted above, the coating composition of this invention can be applied to substrates of various compositions, shapes, sizes and uses. In a preferred embodiment of this process a flexible substrate is coated for the purpose of providing for the substrate an adhesive-releasing surface.

In the adhesive-releasing art a flexible substrate such as paper, polymer film, polymer-coated paper or metal foil is rendered adhesive-releasing by the application of a curable fluid composition to the flexible substrate at a coating weight of from 0.5 to 2 pounds per ream of substrate. After the applied composition has been cured the thus-treated surface is brought into adhesive contact with an adhesive, either free or disposed on a surface of an article. The adhesive-releasing surface thereby serves as a protective layer for one surface of the adhesive until the adhesive is to be used, whereupon it can be readily removed from the adhesive.

In the process of this invention there is provided a fast, clean, efficient process for providing an adhesive-releasing surface that is fully cured, non-transferring and stable when used with cast adhesives or supported adhesives and in an on-line, i.e. immediate adhesive coating, mode or in a conversion, i.e. delayed adhesive coating, mode.

The following examples are disclosed to further teach how to practice, but not to limit, the invention which is properly delineated by the appended claims.

All parts, percentages and ratios are by weight unless otherwise stated.

The state of cure of an adhesive-release coating was determined by the ruboff, migration and smear tests.

Smear of a coating was measured by lightly rubbing the coating with a finger and looking for hazing of the coating. The degree of haze (nil, very slight, slight, moderate, gross) that was observed indicated the degree of smear of the coating. A fully cured coating shows no haze and therefore has nil smear.

Ruboff of a coating was measured by vigorously rubbing the coating with the index finger tip, trying to remove the coating from the paper. The extent of ruboff was described as nil, very slight, slight moderate or gross. A fully cured coating demonstrates nil ruboff.

Migration of a coating was measured by placing a test strip of No. 5910 3M (St. Paul, Minn.) brand transparent tape on the coating, adhesive-bearing surface in contact with the coating, and rubbing the strip 5 to 20 times with a finger to adhere it to the coating. The strip of transparent tape was then removed from the coating and its adhesive-bearing surface was doubled, end to end, onto itself and pressed firmly together. For a coating having nil migration the force needed to separate the double test strip was approximately the same as the force needed to separate a doubled strip of unexposed tape. Other ratings include very slight, slight, moderate and gross migration. A fully cured coating demonstrates nil migration.

Adhesive release for a coating was measured on a fully cured coating.

Each cured coating was prepared for release testing according to the following procedure. The cured coating was coated with adhesive using either a solution of Monsanto (St. Louis, Mo.) GMS-263 acrylic adhesive (hereinafter acrylic adhesive) or National Starch (New York, NY) 36-6045 styrene-butadiene rubber adhesive (hereinafter SBR adhesive). The adhesive solution was applied to the cured coating at a wet thickness of 3 mils (76.2 mm) using a draw down bar. The applied adhesive was air-dried at room temperature for one minute, heated at 70° C. for one minute and then cooled to room temperature again for 1 minute. A sheet of 60 pound matte litho was applied to the dried adhesive and the resulting laminate was pressed with a 4.5 pound rubber coated roller.

Release testing of the laminates was accomplished by cutting the laminates into 1 inch (25.4 mm) strips and pulling the matte/adhesive laminate from the kraft paper/coating laminate at an angle of 180 x at 400 inches/minute (0.17 m/s). The force, in grams per inch, that was required to separate the laminae was noted as adhesive release.

EXAMPLES 1-3

An acrylamidoorganosiloxane having the formula $Me_3SiO(Me_2SiO)_{69.25}(MeYSiO)_{3.75}SiMe_3$, wherein Y denotes a (meth)acrylamido-substituted hydrocarbon radical having the formula $-CH_2CH(CH_3)CH_2NACH_2CH_2NHA$ and A denotes the acrylyl radical, was prepared by the method of Varaprath, U.S. Pat. No. 4,608,270.

A mercaptoorganosiloxane having the formula $Me_3SiO(Me_2SiO)_{115}(MeMSiO)_8SiMe_3$, wherein M denotes $-(CH_2)_3SH$, was prepared by the method of disclosed in U.S. Pat. No. 4,052,529.

Three compositions of this invention were prepared by mixing the (meth)acrylamidoorganosiloxane and the mercaptoorganosiloxane in various amounts so as to provide either 0.17, 0.52 or 0.69 —SH radicals for every $-C(O)CH=CH_2$ radical in the composition and 5%, based on the weight of the two siloxanes, of a 50/50 mixture of benzophenone and 1-hydroxycyclohexylphenyl ketone was added as a photosensitizer. A comparison composition was identically prepared except the mercaptoorganosiloxane was omitted.

The mixtures were coated onto kraft paper at a coating weight of from 0.5 to 1 pound per ream (3000 square feet) and the coatings were irradiated at a distance of 2 to 3 inches with the ultraviolet light from 2 medium pressure mercury vapor lamps having output of 200 watts/inch. The coated paper was exposed to various amounts of UV radiation by passing the coated paper by the mercury vapor lamps at various speeds. The maximum paper speed at which the coating was fully cured was noted.

The results, listed in the Table, show that the maximum curing speed is significantly increased by the presence of as little as 0.17 —SH radicals for every $-C(O)CH=CH_2$ in the composition.

TABLE

| | Examples | | | Comparison |
|---|---|---|---|---|
| Item | 1 | 2 | 3 | |
| Acrylamidesiloxane, g. | 3.0 | 4.0 | 5.0 | 6.0 |
| Mercaptosiloxane, g. | 3.0 | 2.0 | 1.25 | 0.0 |
| —SH/—C(O)CH=CH$_2$, mol ratio | 0.69 | 0.35 | 0.17 | 0.0 |
| Paper Speed, ft./min. | 100 | 80 | 60 | 15 |
| Acrylic Release, g./in. | 90 | 85 | 75 | 105 |
| SBR Release, g./in. | 85 | 75 | 60 | 125 |

EXAMPLE 4

An acrylamidoorganosiloxane having the formula $Me_3SiO(Me_2SiO)_{118}(MeYSiO)_5SiMe_3$, wherein Y denotes a (meth)acrylamido-substituted hydrocarbon radical having the formula $-CH_2CH(CH_3)CH_2NACH_2CH_2NHA$ and A denotes the acrylyl radical, was prepared by the method of Varaprath, U.S. Pat. No. 4,068,270.

A mercaptoorganosiloxane having the formula $Me_3SiO(Me_2SiO)_{113}(MeMSiO)_{10}SiMe_3$, wherein M denotes $-(CH_2)_3SH$, was prepared by the method disclosed in U.S. Pat. No. 4,052,529.

A composition of this invention was prepared by mixing the (meth)acrylamidoorganosiloxane and the mercaptoorganosiloxane in equal amounts so as to provide 1.04 —SH radicals for every $-C(O)CH=CH_2$ radical in the composition; 0.5%, based on the weight of the two siloxanes, of 1-hydroxycyclohexylphenyl ketone; and 1.3% on the same basis, of benzophenone, was added as a photosensitizer.

The mixture was coated onto kraft paper at a coating weight of from 0.5 to 1 pound per ream (3000 square feet) and the coating was irradiated at a distance of 2 to 3 inches with the ultraviolet light from 2 medium pressure mercury vapor lamps having output of 200 watts/inch. The coated paper was exposed to various amounts of UV radiation by passing the coated paper by the mercury vapor lamps at 90, 110 and 130 feet per minute. The coating was fully cured at each speed and released SBR and acrylic adhesive with a force of less than 65 grams per inch.

That which is claimed is:

1. An ultraviolet light-curable composition comprising
   (i) a (meth)acrylamidoorganosilicon compound containing at least one silicon-bonded, (meth)acrylamido-substituted hydrocarbon radical having the formula $-Q(NAQ')_aNAZ$ wherein a has a value of 0 or 1, Z denotes H or R, R denotes a monovalent hydrocarbon radical, Q and Q' denote divalent hydrocarbon radicals and A denotes a (meth)acrylyl radical having the formula —C(O)CB=CH$_2$ wherein B denotes hydrogen or methyl; any remaining silicon-bonded radicals in said (meth)acrylamidoorganosilicon compound being selected from the group consisting of organic radicals, divalent oxygen atoms linking silicon atoms, hydrogen atoms and hydroxyl radicals, (ii) a mercaptoorganosilicon compound containing at least one silicon-bonded, mercapto-substituted hydrocarbon radical having the formula —QSH, wherein Q denotes a divalent hydrocarbon radical, any remaining silicon-bonded radicals in said mercaptoorganosilicon compound being selected from the group consisting of organic radicals, divalent oxygen atoms linking silicon atoms, hydrogen atoms and hydroxyl radicals, and (iii) a photopolymerization-initiating amount of a photosensitizer compound; the relative amounts of said (meth)acrylamidoorganosilicon and mercaptoorganosilicon compounds being sufficient to provide from 0.1 to 2 —SH radicals for every —C(O)CB=CH$_2$ radical.

2. An ultraviolet light-curable composition according to claim 1 wherein the (meth)acrylamidoorganosilicon compound and the mercaptoorganosilicon compound are siloxanes.

3. An ultraviolet light-curable composition according to claim 1 wherein the (meth)acrylamidoorganosilicon compound has the formula YR$^2$SiO(R$^2$SiO)$_x$(YRSiO)$_y$SiR$^2$Y wherein R contains from 1 to 6 carbon atoms, Y denotes R or —Q(NAQ')$_a$NAZ, x has a value of from 0 to 5000 and y has a value of from 0 to 500; there being at least two (meth)acrylamido-substituted hydrocarbon radicals per molecule of (meth)acrylamidoorganosilicon compound 4. An ultraviolet light-curable composition according to claim 3 wherein the mercaptoorganosilicon compound has the formula MR$^2$SiO(R$^2$SiO)$_x$(MRSiO)$_y$SiR$^2$M wherein R contains from 1 to 6 carbon atoms, M denotes R or —QSH, x has a value of from 0 to 5000 and y has a value of from 0 to 500; there being at least two 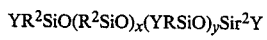 mercapto-substituted hydrocarbon radicals per molecule of mercaptoorganosilicon compound.

5. An ultraviolet light-curable composition according to claim 4 wherein the (meth)acrylamido-substituted hydrocarbon radical has the formula —QNACH$_2$CH$_2$NAH.

6. An ultraviolet light-curable composition according to claim 5 wherein each R denotes the methyl radical.

7. An ultraviolet light-curable composition according to claim 6 wherein the (meth)acrylamidoorganosilicon compound has the formula Me$_3$SiO(Me$_2$SiO)$_z$(MeSiO)$_g$SiMe$_3$
|
QNACH$_2$CH$_2$NAH

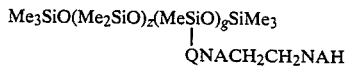

and the mercaptoorganosilicon compound has the formula

Me$_3$SiO(Me$_2$SiO)$_z$(MeSiO)$_g$SiMe$_3$
|
QSH

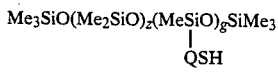

wherein, independently at each occurrence, Me denotes a methyl radical, z has a value of from 10 to 2000 and g has a value of from greater than zero to 0.1 z.

8. An ultraviolet light-curable composition according to claim 7 wherein the (meth)acrylamidoorganosilicon compound has the formula Me$_3$SiO(Me$_2$SiO)$_z$(MeSiO)$_g$SiMe$_3$
            /
     CH$_2$CH(CH$_3$)CH$_2$CH$_2$NCH$_2$CH$_2$NH
                       |           |
                 CH$_2$=CHC=O   O=CCH=CH$_2$

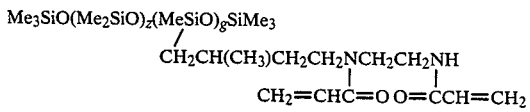

and the mercaptoorganosilicon compound has the formula

Me$_3$SiO(Me$_2$SiO)$_z$(MeSiO)$_g$SiMe$_3$
|
CH$_2$CH$_2$CH$_2$SH

wherein, independently at each occurrence, z has a value of from 50 to 500 and g has a value of from 3 to 10.

9. An ultraviolet light-curable composition according to claim 8 wherein the ratio of the total number of —SH radicals to —C(O)CH=CH$_2$ radicals has a value of from 0.1 to 1.0.

* * * * *